United States Patent
Martin et al.

(10) Patent No.: US 9,632,008 B2
(45) Date of Patent: Apr. 25, 2017

(54) METHOD FOR DETECTING THE FAILURE OF A CHARGE AIR COOLER

(75) Inventors: Ludovic Martin, Villebon sur Yvette (FR); Clement Petit, Paris (FR); Iwona Jedruch, Nancy (FR); Mathieu Mefflet, Nanterre (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 686 days.

(21) Appl. No.: 14/005,950

(22) PCT Filed: Mar. 16, 2012

(86) PCT No.: PCT/FR2012/050552
§ 371 (c)(1),
(2), (4) Date: Dec. 3, 2013

(87) PCT Pub. No.: WO2012/127158
PCT Pub. Date: Sep. 27, 2012

(65) Prior Publication Data
US 2014/0081597 A1    Mar. 20, 2014

(30) Foreign Application Priority Data
Mar. 18, 2011 (FR) .................................. 11 52245

(51) Int. Cl.
*G06F 11/30* (2006.01)
*G21C 17/00* (2006.01)
(Continued)

(52) U.S. Cl.
CPC ......... *G01M 15/04* (2013.01); *F02B 29/0493* (2013.01); *F02D 41/0007* (2013.01);
(Continued)

(58) Field of Classification Search
CPC .................................................. G01M 15/04
(Continued)

(56) References Cited

U.S. PATENT DOCUMENTS

| 7,593,808 B2 * | 9/2009 | Banks ..................... F02B 33/40 701/102 |
| 2006/0116808 A1 * | 6/2006 | Tanaka .................... F02D 41/18 701/102 |
| 2011/0114066 A1 | 5/2011 | Vasallo et al. |

FOREIGN PATENT DOCUMENTS

| EP | 0020146 A1 * | 12/1980 | ......... B60H 1/00007 |
| EP | 1 201 890 | 5/2002 | |

(Continued)

OTHER PUBLICATIONS

Bernard Challen and Rodica Baranescu, eds Diesel Engine Reference Book Second Edition 1999 pp. 55-59.*

(Continued)

*Primary Examiner* — Manuel L Barbee
*Assistant Examiner* — Jeremy Bishop
(74) *Attorney, Agent, or Firm* — Oblon, McClelland, Maier & Neustadt, L.L.P.

(57) ABSTRACT

A method for detecting a failure of a charge air cooler placed in an air supply circuit of an engine, the circuit including an air filter and a compressor. The method is performed continuously and repeatedly. The method includes: determining temperature Tair of the air between the filter and the compressor, the temperature of the air Tapc between the compressor and the cooler, and the temperature of the air Tsras between the cooler and the engine; calculating the Tapc-Tsras/Tapc-Tair ratio, which is a parameter indicative of effectiveness of the cooler; comparing the parameter against a predetermined threshold effectiveness value; and making a diagnosis as to whether the cooler is operating correctly or incorrectly, on the basis of the comparison.

10 Claims, 2 Drawing Sheets

Figure 1:
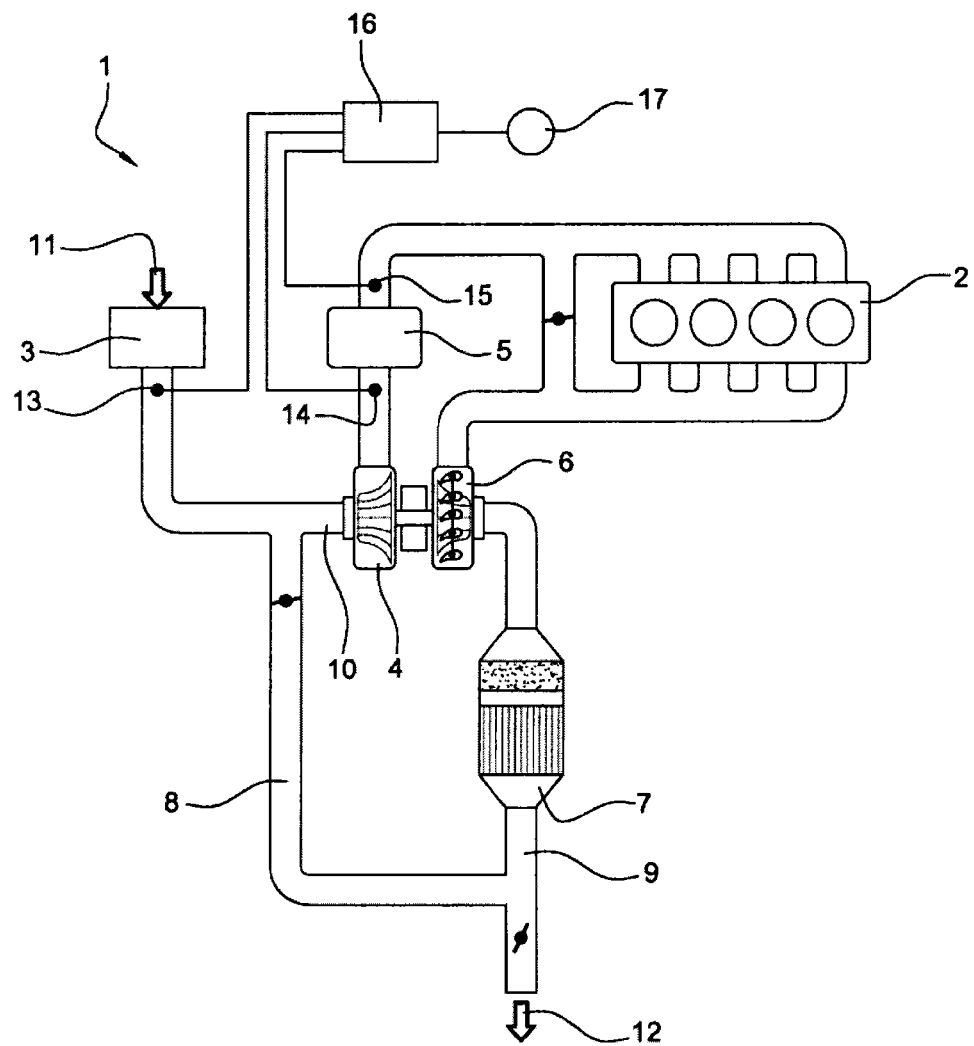

(51) Int. Cl.

| | |
|---|---|
| *G01M 15/04* | (2006.01) |
| *F02B 29/04* | (2006.01) |
| *F02D 41/00* | (2006.01) |
| *F02D 41/22* | (2006.01) |
| *F02M 35/10* | (2006.01) |
| *F02B 37/00* | (2006.01) |
| *F02M 26/06* | (2016.01) |
| *F02M 26/10* | (2016.01) |
| *F02M 26/15* | (2016.01) |

(52) U.S. Cl.
   CPC ....... *F02D 41/221* (2013.01); *F02M 35/1038* (2013.01); *F02B 37/00* (2013.01); *F02D 2200/0414* (2013.01); *F02D 2200/0416* (2013.01); *F02M 26/06* (2016.02); *F02M 26/10* (2016.02); *F02M 26/15* (2016.02); *Y02T 10/144* (2013.01); *Y02T 10/146* (2013.01); *Y02T 10/40* (2013.01)

(58) Field of Classification Search
   USPC .......................................................... 702/183
   See application file for complete search history.

(56) References Cited

FOREIGN PATENT DOCUMENTS

| | | | |
|---|---|---|---|
| EP | 1201890 A1 * | 5/2002 | .............. F01P 11/16 |
| EP | 1 548 260 | 6/2005 | |
| GB | 2 475 274 | 5/2011 | |
| JP | 2007 146712 | 6/2007 | |
| KR | 2011 0058981 | 6/2011 | |

OTHER PUBLICATIONS

International Search Report Issued May 14, 2012 in PCT/FR12/050552 Filed Mar. 16, 2012.

\* cited by examiner

METHOD FOR DETECTING THE FAILURE OF A CHARGE AIR COOLER

The invention relates to a method for detecting the failure of an air cooler, in the air intake circuit of a supercharged engine. The air intake circuit of a supercharged engine comprises an air filter, a compressor, and a charge air cooler, this circuit being placed upstream of said engine. Since the charge air cooler is a key part of this circuit, it is therefore vitally important to monitor its correct operation throughout the life of the vehicle. The invention relates to a method making it possible to instantaneously and permanently detect a failure of this cooler, and to a device provided to implement this method.

Methods aiming to detect the failure of a cooler exist and have already been the subject of patents. The patent EP1201890, which discloses such a method based on the measurement, upstream and downstream of this cooler, of the air temperature, the difference in these temperatures then being compared to a predetermined threshold value, can be cited as an example. Depending on the deviation recorded in relation to this threshold value, a diagnosis of correct or incorrect operation of the cooler can then be made. This method, based as it is on only two temperature measurements, may seem fairly fragile, because, if one of the two values acquired is incorrect, either through an approximate placement of one of the two sensors, or quite simply through a malfunction of one of the two sensors, the diagnosis concerning the operation of the cooler is falsified.

The methods for detecting the failure of a charge air cooler according to the invention is based on the determination of the air temperature at a multiplicity of points situated in the air supply circuit of the supercharged engine, the duly determined temperatures then being processed to calculate a parameter representative of the efficiency of said cooler, this parameter finally being compared to a predetermined efficiency threshold value. This comparison makes it possible to support a diagnosis of correct or incorrect operation of the cooler. The methods according to the invention appear more comprehensive, safer and more reliable than the methods of the prior art.

The invention relates to a method for detecting the failure of a charge air cooler placed in an air supply circuit of an engine, said circuit also comprising an air filter and a compressor, said method being carried out continuously, by successive iterations, and being characterized in that it comprises:
- a step of determining the temperature Tair of the air between the filter and the compressor, the temperature of the air Tape between the compressor and the cooler and the temperature of the air Tsras between said cooler and the engine (2),
- a step of calculating the ratio Tapc-Tsras/Tapc-Tair which is a parameter representative of the efficiency of the cooler,
- a step of comparing this parameter with a predetermined threshold efficiency value,
- a step of establishing a diagnosis of correct or incorrect operation of the cooler, performed on the basis of this comparison.

In other words, the principle of this method is based on an ongoing comparison between a calculated parameter and a threshold value, this comparison then being able to reveal a failure of the cooler. This method is performed by successive iterations over controlled time intervals, and, in the same way as occurs for a certain number of other parts of the vehicle, that have to fulfill a very specific function, as long as the operation of said parts is normal, the method continues by successive iterations, with no manifestation being perceptible in said vehicle. On the other hand, in the case where the comparison reveals a failure preventing the cooler from fully carrying out its function, a malfunction signal is sent to alert the driver, and the method is interrupted. This method is automatically implemented, as soon as the engine of the vehicle is switched on, the cooler cutting in as soon as the temperature of the air is made to increase. This method is particularly suited to supercharged diesel engines. The time intervals, during which the steps of the method are carried out, are set and managed automatically on the basis of certain criteria, and of certain dynamic parameters of the vehicle.

Advantageously, the steps of calculating, comparing and establishing a diagnosis are carried out by means of an embedded electronic processing system. In practice, a method according to the invention can be justified only if the processing of all the information needed to establish the diagnosis can be performed extremely reliably, and almost instantaneously, because a failure of the cooler, even for a short time, cannot be tolerated for fear of breaking the supercharged engine. An embedded electronic system allows for a good processing responsiveness, good accuracy in the calculations, and a reliable establishment of the diagnosis.

Preferentially, the method comprises a step of revealing a diagnosis of failure, through the automatic activation of an indicator. In practice, establishing a diagnosis of failure that is as safe and reliable as it can be, is of course a necessary operation but one which is insufficient in itself, and it is important that this diagnosis must still be communicated clearly and in real time to the driver of the vehicle. It is therefore vitally important for the method according to the invention to implement a step of restoration of this diagnosis, in order to be able to act quickly accordingly. The indicator may take any form, the main thing being that it can be activated, in one way or another, to transmit the information indicating that the cooler is failing and fulfilling its function only partially or not at all.

According to a preferred embodiment of a method according to the invention, the indicator is a lamp, which lights up when a failure of the cooler is detected. With this type of indicator placed, for example, on the dashboard, a driver can only notice it, if it lights up.

Advantageously, the method is performed continuously, by successive iterations, over time intervals each corresponding to a stabilized engine speed, to have stable air flows. In other words, the steps of the method are carried out not over regular and constant time intervals, but over variable time intervals, each corresponding to a stabilized engine speed, for which the speed of the vehicle is substantially constant. In this way, the diagnosis does not risk being cut short by taking into account a variable speed, that may notably increase suddenly, the determination of the temperatures in these conditions not providing any tangible information as to the correct or incorrect operation of the cooler.

According to another preferred embodiment of a method according to the invention, the determination of the temperatures is performed on the basis of measurements performed directly in the air supply circuit, by means of sensors placed at appropriate points. This configuration may seem somewhat bulky and fairly heavy to implement, but it allows for a reliable and accurate determination of the different temperatures, the diagnosis resulting from these measurements therefore proving very safe.

According to another preferred embodiment of a method according to the invention, the temperatures are assessed on the basis of a modeling based on parameters available in the vehicle. Unlike the previous configuration, this configuration is simple and quick to apply, because it does not require the use of additional specific parts such as, for example, temperature sensors. On the other hand, the temperatures may be assessed with a certain approximation, rendering the failure diagnosis more imprecise.

Preferentially, the method is implemented automatically, during the vehicle rolling phases. In practice, it is essential to avoid carrying out this method during the vehicle idling or stopped phases, because, during these phases, the temperature of the air under the hood of the vehicle increases significantly, and the effectiveness of the charge air cooler is limited thereby.

Advantageously, the threshold efficiency value is set as a function of the engine operating point, and therefore depends on the speed of the vehicle. In this way, the method is more comprehensive and more accurate, because it takes account of the engine speed and of the air flow rate entering into the engine, which will influence the value of the air temperatures at different points of the supply circuit. It is easy to imagine that, the greater the speed of the vehicle, the higher the threshold efficiency value of the cooler. Therefore, the threshold efficiency value of the cooler is automatically readjusted during the method, to adapt to each engine speed encountered.

Preferentially, the determination of the threshold efficiency value is obtained by means of a mapping. For each type of engine, mappings are available to assess the threshold efficiency value of the cooler, as a function of the engine speed or of the speed of the vehicle and of the air flow rate entering into the engine, even as a function of other parameters.

The invention relates also to a device making it possible to implement a method according to the invention. The main technical feature of a device according to the invention is that it comprises three temperature sensors, a mapping giving the value of the threshold efficiency of the cooler as a function of the engine speed and of an air flow rate entering into the engine, an indicator indicating incorrect operation of the cooler, and electronic processing equipment making it possible, continuously, and iteratively, to calculate the parameter representative of the efficiency of the cooler, to compare it to a threshold efficiency value readjusted to each engine speed encountered, and to activate the indicator in the case of detection of the failure of the cooler.

The methods for detecting the failure of a cooler according to the invention offer the advantage of being effective, safe and reliable, while involving only few additional, bulky and costly parts. The detection methods according to the invention also have the advantage of conferring a marked secure and economical nature on the vehicles in which they are deployed, by avoiding causing a failure of the vehicle and potential destruction of the engine.

A detailed description of a preferred embodiment of a method for detecting the failure of a cooler according to the invention is given hereinbelow, with reference to FIGS. 1 and 2.

Figure 2:
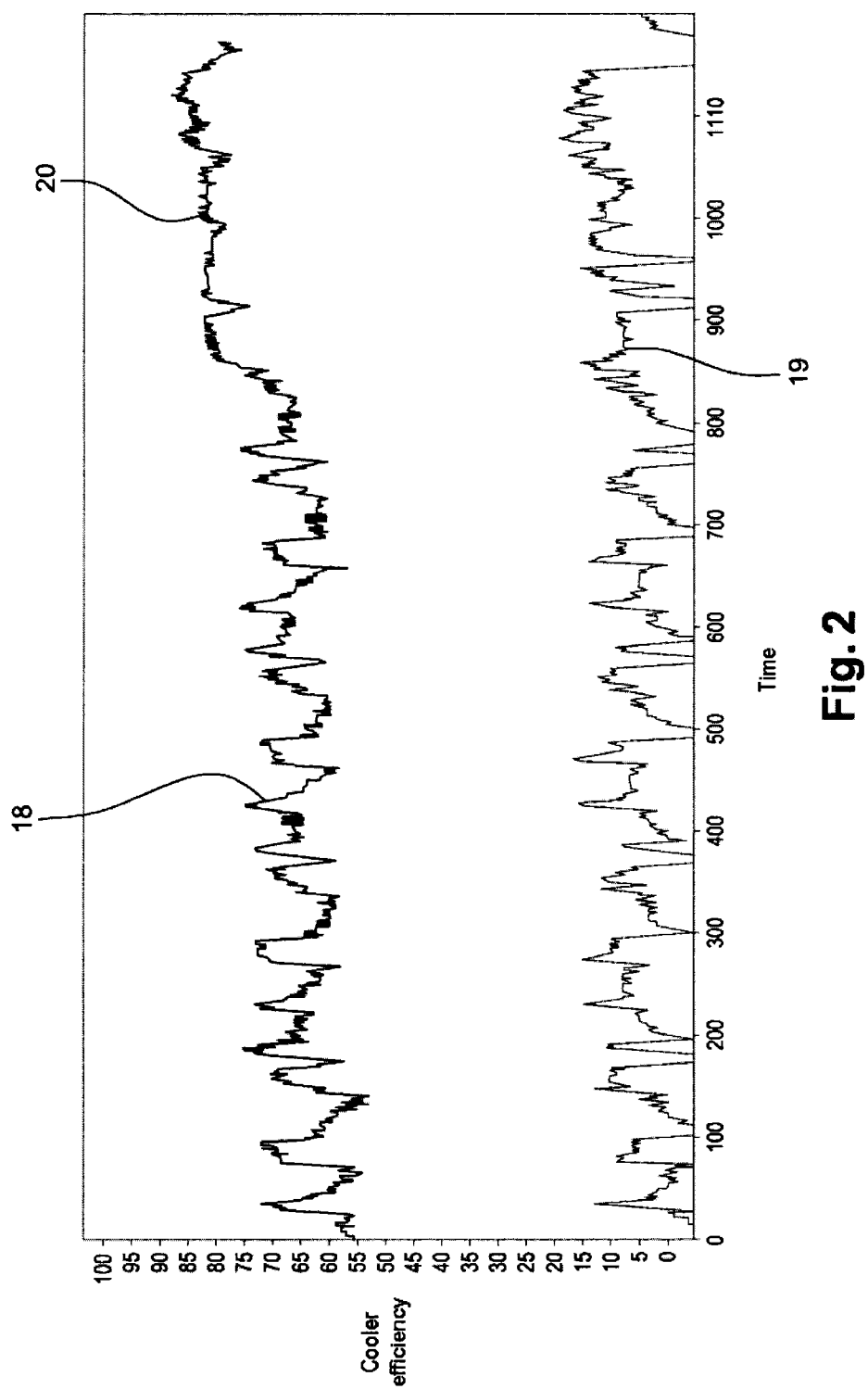

FIG. 1 is a schematically represented view of an air supply circuit of a supercharged engine, FIG. 2 is a comparative diagram of the efficiency of a cooler as a function of time, one curve relating to a valid cooler, the other curve relating to a defective cooler.

With reference to FIG. 1, an air supply circuit 1 of a supercharged diesel engine 2 comprises, in the following order, an air filter 3, a compressor 4, and a charge air cooler 5, placed upstream of said engine 2, said air circuit 1 being continued by a turbine 6 situated at the outlet of the engine 2 and ending with a catalytic convertor 7 placed downstream of said turbine 6, an EGR loop 8 linking the outlet 9 of said convertor 7 to the inlet 10 of the compressor 4. The air enters into the circuit 1 upstream of the air filter 3, as indicated by the arrow 11, passes through said filter 3 then arrives in the compressor 4. The pressurized and superheated air produced by said compressor 4 passes through the cooler 5 then enters into the engine 2. At the outlet of the engine 2, the air passes through the turbine 6 before being routed into the catalytic convertor 7 then toward the outlet of said circuit 1 as shown by the arrow 12, a portion of this air being recycled by being injected upstream of the compressor 4, via the EGR loop 8.

In the context of the method for detecting the failure of the cooler 5 according to the invention, three temperature sensors 13, 14, 15 are located in the air supply circuit 1, the first 13 being placed downstream of the air filter 3 to measure the temperature Tair of the incident air entering into the circuit 1, the second 14 being situated between the compressor 4 and the cooler 5 to measure the temperature Tapc of the superheated air at the compressor 4 outlet, and the third 15 being positioned just after the cooler 5, to measure the temperature Tsras of the air cooled by said cooler 5. These three temperatures are measured simultaneously and continuously, by successive iterations, over time intervals each corresponding to a stabilized engine speed, for which the speed of the vehicle is constant, in order for these measurements to be performed on a uniform and constant air stream. In practice, if these measurements were performed over predefined and constant time intervals, without taking account of the speed changes of the engine 2, they would not be representative of the correct or incorrect operation of the cooler 5, since they would vary as a function of these different speeds, independently of the action of the cooler 5. The sensors 13, 14, 15 are connected to an embedded electronic computation and processing system 16, and the temperature readings are therefore instantaneously and directly transmitted to this system 16, which will first of all calculate a parameter, Tapc-Tsras/Tapc-Tair which is representative of the efficiency of the cooler 5, this parameter being dimensionless and being able to be multiplied by a factor of 100, for the facilities of presentation and/or calculation. The electronic system 16 has previously been parameterized by means of a mapping giving a threshold efficiency parameter of the cooler 5, for each possible engine speed, and therefore for each speed of the vehicle. In this way, for a given engine speed and a given incoming air flow rate, the electronic system compares the parameter representative of the efficiency of the cooler 5, and which is calculated on the basis of temperature measurements, to the threshold value that it has automatically selected as a function of the engine speed. The method is carried out continuously, by successive iterations, and if the calculated parameter is below the preselected threshold value a lamp 17 connected to the electronic system 16 and apparent on the dashboard of the vehicle lights up to alert the driver that the cooler 5 is failing.

FIG. 2 shows two examples of calculation, over time, of the parameter representative of the efficiency of a cooler 5, on the one hand, for a cooler in good working order, and on the other hand, for a defective cooler. These two curves 18, 19 show perfectly, in both substance and form, the calculations that the embedded electronic system 16 can produce on the basis of the temperature measurements carried out by means of the sensors 13, 14, 15 placed in the circuit 1. The top curve 18 is representative of the variation over time of the parameter illustrating the efficiency of a cooler 5 in good working order, and the bottom curve 19, that of a defective cooler 5. By setting a reasonable threshold value for the efficiency in the region of 45%, this diagram makes it possible to clearly discriminate the valid cooler from the defective cooler. In this diagram, and by way of illustration, it is also possible to observe, on the top curve 18 relating to a valid cooler, a slight increase 20 in the calculated parameter commencing after 800 s to 900 s. This increase quite simply reflects a change of engine speed, in the direction of a speed increase, and makes it possible to show that it is necessary to modify the threshold value of the efficiency of the cooler 5 to adapt it to each speed change.

A method for detecting failure of a charge air cooler 5 according to the invention follows, iteratively, the following steps:

determination of the temperature Tair of the air between the filter 3 and the compressor 4, of the temperature of the air Tape between the compressor 4 and the cooler 5 and of the temperature of the air Tsras between said cooler 5 and the engine 2, this determination being carried out by means of the temperature sensors 13, 14, 15, calculation, over a given time band corresponding to a stabilized speed of the engine 2, of the ratio Tapc-Tsras/ Tapc-Tair, comparison of this parameter with a predetermined threshold efficiency value, matched to the corresponding engine speed, establishment of a diagnosis of correct or incorrect operation of the cooler 5, performed on the basis of this comparison, if the calculated parameter remains greater than the threshold value, the method is continued by returning to the first step of determining the temperatures and so on, if the calculated parameter becomes less than the threshold value, the method is stopped; the indicator lamp 17 making it possible to reveal a failure of the cooler 5 then lights up. It then becomes an urgent matter to repair the defective cooler 5 or change it.

The invention claimed is:

1. A method for detecting failure of a charge air cooler placed in an air supply circuit of an engine, the circuit including an air filter and a compressor, the method being carried out continuously, by successive iterations, and comprising:

determining temperature Tair of air between the filter and the compressor, temperature of air Tapc between the compressor and the cooler, and temperature of air Tsras between the cooler and the engine;

calculating a ratio (Tapc−Tsras)/(Tapc−Tair), which is a parameter representative of efficiency of the cooler;

comparing the parameter with a predetermined threshold efficiency value; and establishing a diagnosis of correct or incorrect operation of the cooler, based on comparing, wherein the threshold efficiency value is set as a function of an engine operating point, and therefore depends on a speed of a vehicle.

2. The method as claimed in claim 1, wherein the calculating, comparing, and establishing a diagnosis are carried out by an embedded electronic processing system.

3. The method as claimed in claim 1, further comprising revealing a diagnosis of failure, through automatic activation of an indicator.

4. The method as claimed in claim 3, wherein the indicator is a lamp that lights up, when a failure of the cooler is detected.

5. The method as claimed in claim 1, performed continuously, by successive iterations, over time intervals each corresponding to a stabilized engine speed, to have stable air flows.

6. The method as claimed in claim 1, wherein the determining the temperatures is performed based on measurements performed directly in an air supply circuit, by sensors placed at appropriate points.

7. The method as claimed in claim 1, wherein the temperatures are assessed based on parameters available in a vehicle.

8. The method as claimed in claim 1, implemented automatically, during vehicle rolling phases.

9. The method as claimed in claim 1, wherein a determination of the threshold efficiency value is obtained by a mapping.

10. A device configured to detect a failure of a cooler in an air supply circuit of a supercharged engine, by implementing the method as claimed in claim 1, comprising:

three temperature sensors;

a mapping giving a value of the threshold efficiency of the cooler as a function of engine speed and of an air flow rate entering into the engine;

an indicator configured to indicate incorrect operation of the cooler; and electronic processing equipment configured to, continuously, calculate the parameter representative of the efficiency of the cooler, to compare the calculated parameter to a threshold efficiency value readjusted to each engine speed encountered, and to activate an indicator in a case of detection of failure of the cooler.

* * * * *